United States Patent [19]
Yeh et al.

[11] Patent Number: 5,832,147
[45] Date of Patent: Nov. 3, 1998

[54] HOLOGRAPHIC OPTICAL INTERCONNECT SYSTEM AND METHOD FOR BOARD-TO-BOARD AND CHIP-TO-CHIP COMMUNICATION INTERCONNECTIONS

[75] Inventors: Jang-Hun Yeh, Streamwood; John R. Welk, Addison, both of Ill.

[73] Assignee: Motorola, Inc., Schaumburg, Ill.

[21] Appl. No.: 757,991

[22] Filed: Nov. 27, 1996

[51] Int. Cl.⁶ ..................................... G02B 6/34
[52] U.S. Cl. ................................ 385/14; 359/15; 359/34; 359/130; 385/15; 385/37
[58] Field of Search .................................. 385/14, 15, 17, 385/18, 24, 31, 37; 359/15, 19, 20, 34, 127, 128, 130

[56] References Cited

U.S. PATENT DOCUMENTS

| | | | |
|---|---|---|---|
| 4,720,634 | 1/1988 | D'Auria et al. | 250/551 |
| 4,892,376 | 1/1990 | Whitehouse | 359/154 |
| 5,061,027 | 10/1991 | Richard | 385/14 |
| 5,101,460 | 3/1992 | Richard | 385/37 |
| 5,170,269 | 12/1992 | Lin et al. | 359/20 X |
| 5,182,780 | 1/1993 | Robertson | 385/14 |
| 5,204,866 | 4/1993 | Block et al. | 372/27 |
| 5,218,654 | 6/1993 | Sauter | 385/24 |
| 5,237,434 | 8/1993 | Feldman et al. | 359/19 |
| 5,245,680 | 9/1993 | Sauter | 385/24 |
| 5,335,300 | 8/1994 | Hartman et al. | 385/37 |
| 5,590,367 | 12/1996 | Lin et al. | 385/17 X |
| 5,638,469 | 6/1997 | Feldman et al. | 385/14 |

OTHER PUBLICATIONS

Free-space holographic optical interconnects for board-to-board and chip-to-chip interconnections. Optics Letters/vol. 21, No. 16/Aug. 15, 1996, Jang-hun Yeh and Raymond K. Kostuk, Optical Society of America 1996, pp. 1274-1276.

Primary Examiner—John D. Lee
Attorney, Agent, or Firm—Darleen J. Stockley

[57] ABSTRACT

A holographic optical interconnect system (100) and method (200) provide flexible, efficient interconnection of a plurality of circuit boards CBs and a plurality of integrated circuit chips. Each CB has at least an optically transparent substrate OTS mate parallel to the CB and extending outside a CB holder. Each OTS mate has parallel sides and carries at least two holographic optical elements HOEs. A first one of the HOEs on a first OTS mate reflects at least a predetermined portion of a first light beam transmitted by a transmitter on a corresponding CB to another HOE, which transmits a received light beam via free space outside the CB holder. On another OTS mate, two HOEs are utilized to receive and direct at least part of the light beam received to a detector on a corresponding CB via free space within the circuit board holder or reflection within the OTS mate.

11 Claims, 1 Drawing Sheet

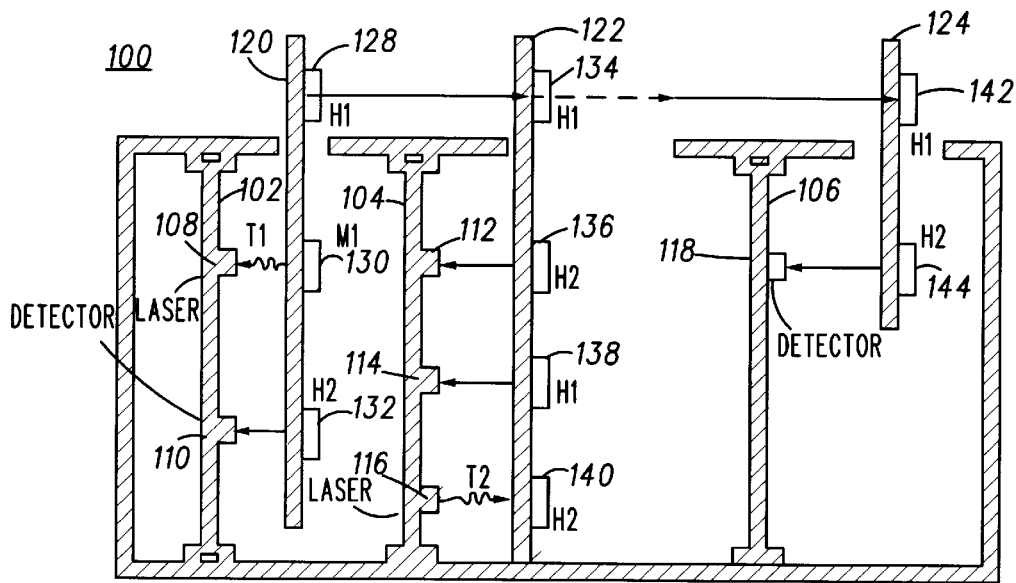

DIRECTING, BY A FIRST ONE OF THE AT LEAST TWO HEs ON A FIRST OTS MATE, AT LEAST A PREDETERMINED PORTION OF A FIRST LIGHT BEAM TRANSMITTED BY A TRANSMITTER ON A CORRESPONDING CB TO A SECOND ONE OF THE HEs

208

DIRECTING AT LEAST A SECOND PREDETERMINED PORTION OF THE FIRST LIGHT BEAM TO ANOTHER HE

204

TRANSMITING, BY SECOND ONE OF THE HEs, THE PREDETERMINED PORTION OF THE LIGHT BEAM VIA FREE SPACE OUTSIDE THE CIRCUIT BOARD HOLDER

206

RECEIVING AND DIRECTING, BY A THIRD HE ON ANOTHER OTS MATE, AT LEAST PART OF THE PREDETERMINED PORTION OF THE LIGHT BEAM VIA ONE OF: FREE SPACE WITHIN THE CIRCUIT BOARD HOLDER AND REFLECTION WITHIN THE OTS MATE, TO A FOURTH HE ON THE OTS MATE TO A DETECTOR ON A CORRESPONDING CB

210

UTILIZING AT LEAST ONE SET OF A PRIMARY HE AND A SECONDARY HE, EACH CARRIED ON AN OTS MATE FOR A CB CORRESPONDING TO THE OTS MATE, FOR TRANSMITTING A SECOND LIGHT BEAM BY A LIGHT TRANSMITTER CARRIED BY THE CB TO THE PRIMARY HE THAT IS USED TO REFLECT AT LEAST A PREDETERMINED PORTION OF THE SECOND LIGHT BEAM TO THE SECONDARY HE, WHICH REFLECTS A RECEIVED LIGHT BEAM TO A DETECTOR ON THE CB VIA ONE OF: FREE SPACE WITHIN THE CIRCUIT BOARD HOLDER AND REFLECTION WITHIN THE OTS MATE

212

DIRECTING AT LEAST A SECOND PREDETERMINED PORTION OF THE SECOND LIGHT BEAM TO ANOTHER HE

FIG.2

HOLOGRAPHIC OPTICAL INTERCONNECT SYSTEM AND METHOD FOR BOARD-TO-BOARD AND CHIP-TO-CHIP COMMUNICATION INTERCONNECTIONS

FIELD OF THE INVENTION

The present invention relates to signal communications using optical interconnects and, more particularly, to utilizing volume holograms for optical interconnect signal communications systems.

BACKGROUND OF THE INVENTION

Numerous methods have been described for utilizing optical beams for interconnection of either circuit boards or integrated circuit chips. On some printed circuit boards an electronic subsystem includes an optical generator for converting a first electrical signal into a first optical beam and then uses an amplitude beam splitter to split the optical beam into two opposite directions, where the beams travel along a bus. The optical beams are transmitted to optical detectors and then converted to electrical signals. This method is limited by signal distortion due to multiple reflections along the bus.

Optical modulators have been used for connecting circuits of different circuit cards. A light source sends a light beam through a hole on a circuit board. An optical modulator mounted at a hole on a circuit board writes information onto the light beam, i.e., convert the intensity or frequency of the light beam to a modulated signal. Then an optical demodulator mounted at a second hole on a second circuit card reads the information from the light beam. This method of circuit connection does not utilize holograms and therefore the interconnect flexibility is limited.

Optical backplanes have been designed that have buses that use graded-index lenses and beam splitters as optical taps for coupling optical signals between optical transmitting and receiving elements mounted on removable cards that are plugged into a backplane board. This method enhances optical signals on the bus using dual transmitter-receiver repeaters. This method requires the use of intermediate optical tap prisms to redirect the light beams and requires the additional expense of repeaters.

Holograms have been utilized for optical interconnect structures between multiple integrated circuits. In one system, multichip modules having high density optical and electrical interconnections between integrated circuit chips have utilized a hologram positioned in the optical path between optical transmitters and optical detectors with a planar mirror positioned opposite the hologram to direct the optical beams. However over time, a mirror may move slightly, thus interfering with proper direction of the optical beams.

In another system, optoelectronic transmitters and receivers are coupled to planar optical waveguides. The planar optical waveguides use holographic optical elements to direct optical emissions from the opto-electronic transmitters into the planar optical waveguide. This implementation is limited to chip to chip connection.

An optical backplane has been described that provides for interconnecting a plurality of printed circuit boards using a multiplicity of hologram elements. The surface that carries the holograms is generally bonded to a chip substrate via a transparent medium, thus requiring a high degree of accuracy for alignment of the plurality of optical paths.

Another device establishes optical connection links between a plurality of electronic component cards by alternately reflecting a collimated beam of light along a path to an optical diffracting element that converts the collimated beam of light to a convergent beam that is transmitted to a detector. This method does not provide for chip-to-chip transmission. Though a free-space holographic optical interconnect has been shown for board-to-board and chip-to-chip interconnections, this method relied upon board-to-board interconnections by propagation of beams through openings on the circuit boards, which involves the complexity of cutting holes and aligning the holes for multiple printed circuit boards to allow passage of the light beams.

Thus, there is a need for a method and device for providing a non-complex, efficient holographic optical interconnect system that facilitates board-to-board and chip-to-chip connection.

BRIEF DESCRIPTION OF THE DRAWING

FIG. 1 is a schematic representation of a holographic optical interconnect system in accordance with the present invention.

FIG. 2 is a flow chart of one embodiment of steps for implementing a holographic optical interconnect method in accordance with the present invention.

DETAILED DESCRIPTION OF A PREFERRED EMBODIMENT

The present invention provides a flexible, efficient holographic interconnect system for connecting board-to-board and chip-to-chip. Light beams are transmitted through free space outside a circuit board holder to allow unencumbered connection of the circuit boards. The light beams may be transmitted through free space inside the circuit board holder or alternatively, reflected within an optically transparent substrate (OTS) using holographic optical elements (HOEs) to direct the light beams from transmitters to detectors, thus facilitating chip-to-chip light signal transmission.

As shown in FIG. 1, numeral 100, the present invention provides a holographic optical interconnect system for interconnection of a plurality of circuit boards CBs (102, 104, . . . , 106) and a plurality of integrated circuit chips (108, 110, 112, 118; 114, 116;108 and 116 including lasers) wherein each CB has at least an OTS mate ( 120, 122, . . . 124) situated parallel to the CB (102, 104, . . . , 106) and extending outside a circuit board holder (126). Each OTS mate ( 120, 122, . . . 124) has parallel sides and carries at least two holographic optical elements HOEs (H1, H2, M1; 128, 130, 132, 134, 136, 138, 140, 142, 144, . . . ). A first one (130, M1) of the at least two HOEs on a first OTS mate (120) directs at least a predetermined portion of a first light beam transmitted by a transmitter (T1, 108) on a corresponding CB (102) to a second one of the HOEs (H1, 128). The first one (130, M1) of the at least two HOEs may also be a multiplexing HOE, i.e., may reflect another predetermined portion of the first light beam along the first OTS mate (120) in another direction to another HOE (H2, 132). The second one (H1, 128) of the HOEs transmits the predetermined portion of the light beam via free space outside the CB holder (126) to another OTS mate (122). Each OTS mate (120, 122, . . . , 124) has a corresponding CB (102, 104, . . . 106). There is at least a second OTS mate (122) that has at least two HOEs (134, 136) that are utilized to receive and direct at least part of the predetermined portion of the light beam to a detector (112) on a corresponding CB (104) via one of: free space within the circuit board holder and reflection within the OTS mate (122).

In addition, the system may include at least one set of a primary HOE (H2, 140) and a secondary HOE (H1, 138), each carried on an OTS mate (122), wherein a CB (104) corresponding to the OTS mate (122) carries a light transmitter (T2, 116) for sending a second light beam to the primary HOE (H2, 140). The primary HOE (H2, 140) typically then reflects at least a predetermined portion of the second light beam to the secondary HOE (H1, 138), which reflects a received light beam to a detector (114) on the CB (104) via either free space within the circuit board holder (126) or reflection within the OTS mate (122). The primary HOE or the first one (130, M1) of the at least two HOEs may be selected to be a multiplexing HOE, thus providing the alternative of sending another portion of the second light beam to another HOE for reflection to another detector on the corresponding CB.

FIG. 2, numeral 200, is a flow chart of one embodiment of steps for implementing a holographic optical interconnect method in accordance with the present invention. The holographic optical interconnect method of the present invention provides interconnection of a plurality of CBs and a plurality of integrated circuit chips, wherein each CB has at least an OTS mate situated parallel to the CB and extending outside a circuit board holder, each OTS mate has parallel sides and carries at least two HOEs. The method includes the steps of: A) directing (202), by a first one of the at least two HOEs on a first OTS mate, at least a predetermined portion of a first light beam transmitted by a transmitter on a corresponding CB to a second one of the HOEs; B) transmitting (204), by second one of the HOEs, the predetermined portion of the light beam via free space outside the circuit board holder; and C) receiving and directing (206), by a third HOE on another OTS mate, at least part of the predetermined portion of the light beam via one of: free space within the circuit board and reflection within the OTS mate, to a fourth HOE on the OTS mate to a detector on a corresponding CB.

Directing at least a predetermined portion of the first light beam may further include directing (208) at least a second predetermined portion of the first light beam to another HOE.

In addition, one may further utilize (210) at least one set of a primary HOE and a secondary HOE, each carried on an OTS mate for a CB corresponding to the OTS mate, for transmitting a second light beam by a light transmitter carried by the CB to the primary HOE that is used to direct (212) at least a predetermined portion of the second light beam to the secondary HOE. The secondary HOE then reflects a received light beam to a detector on the CB via one of: free space within the circuit board holder and reflection within the OTS mate.

Directing at least a predetermined portion of the second light beam may be selected to further include directing at least a second predetermined portion of the second light beam to another HOE.

Thus, the holographic optical interconnect system may be implemented as a plurality of opto-electronic transmitters wherein at least a first opto-electronic transmitter of the plurality of opto-electronic transmitters is coupled to a circuit board, for transmitting a light beam to a first OTS plate having parallel faces. The first OTS plate extends beyond an edge of the circuit board outside of a circuit board holder and has a first HOE disposed on a parallel face in line with the transmitted light beam, for reflecting at least a predetermined portion of the transmitted beam within the OTS plate to a second HOE outside the circuit board holder to provide a first reflected light beam to at least a second OTS plate that is parallel to a second CB.

The at least second OTS plate typically has at least a third HOE outside the circuit board holder for reflecting at least part of the at least predetermined portion of the first reflected light beam to a fourth HOE that reflects part of the predetermined portion of the first reflected light beam to a detector on a corresponding second CB.

Where selected, at least part of the predetermined portion of the first reflected light beam may be reflected by the third HOE to a third OTS plate having a fifth HOE outside the circuit board holder for reflecting the at least part of the first reflected light beam alternately within the third OTS plate to a sixth HOE for facilitating reflection of the at least part of the first reflected light beam to a detector on a corresponding third CB that is parallel to the third OTS plate.

The first HOE may be selected to be a multiplexing HOE for reflecting in an outward fan manner to facilitate transmission of a preselected portion of the first reflected light beam to another HOE that reflects the preselected portion of the first reflected light beam to a detector disposed on the first CB.

Glass or acrylic is typically utilized as a workable optically transparent substrate. The DuPont OmniDex® holographic photopolymer is typically utilized to prepare a volume holographic optical element that is then attached to the OTS mate/plate as is known in the art. As is known in the art, holographic optical elements are prepared by exposing the photopolymer to a pair of interference beams (typically from the same laser) that generate a sinusoidal grating pattern, curing the exposed photopolymer (about 30 seconds is a workable curing time) and then baking the cured photopolymer at 120° C. for two hours. The length of the exposure time depends on the speed of the photopolymer and the light intensity of the two interference beams. The total exposure energy is determined by the required refractive index modulation of the holographic optical element to achieve the desired diffraction efficiency. The diffraction angle of the holographic optical element is typically selected to exceed the critical angle of the substrate material to satisfy the total internal reflection condition.

The wavelengths/wavelength of the two interference beams are/is selected by matching the wavelength of the sensitivity of the photopolymer. Different types of OmniDex® photopolymer can be selected for use either with green, blue, or red lasers for this application. The laser power of the transmitter and the detector sensitivity determine a maximum workable interconnection distance.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. A holographic optical interconnect system for interconnection of a plurality of circuit boards CBs and a plurality of integrated circuit chips, wherein each CB has at least an optically transparent substrate OTS mate situated parallel to the CB and extending outside a circuit board holder, each OTS mate has parallel sides and carries at least two holographic optical elements HOEs, wherein a first one of the at least two HOEs on a first OTS mate directs at least a predetermined portion of a first light beam transmitted by a transmitter on a corresponding CB to a second one of the HOEs, which transmits the predetermined portion of the light beam via free space outside the CB holder and wherein, on at least one of the remaining OTS mates, the two HOEs are utilized to receive and direct at least part of the predetermined portion of the light beam to a detector on a corresponding CB via one of: free space within the circuit board holder and reflection within the OTS mate.

2. The holographic optical interconnect system of claim 1 wherein the first one of the two HOEs is multiplexing HOE.

3. The holographic optical interconnect system of claim 1 further including at least one set of a primary HOE and a secondary HOE, each carried on an OTS mate, wherein a CB corresponding to the OTS mate carries a light transmitter for sending a second light beam to the primary HOE that is used to reflect at least a predetermined portion of the second light beam to the secondary HOE, which reflects a received light beam to a detector on the CB via one of: free space within the circuit board holder and reflection within the OTS mate.

4. The holographic optical interconnect system of claim 3 wherein the primary HOE is a multiplexing HOE.

5. A holographic optical interconnect method for providing interconnection of a plurality of circuit boards CBs and a plurality of integrated circuit chips, wherein each CB has at least an optically transparent substrate OTS mate situated parallel to the CB and extending outside a circuit board holder, each OTS mate has parallel sides and carries at least two holographic optical elements HOEs, comprising the steps of:

A) directing, by a first one of the at least two HOEs on a first OTS mate, at least a predetermined portion of a first light beam transmitted by a transmitter on a corresponding CB to a second one of the HOEs;

B) transmitting, by second one of the HOEs, the predetermined portion of the light beam via free space outside the circuit board holder;

C) receiving and directing, by a third HOE on another OTS mate, at least part of the predetermined portion of the light beam via one of: free space within the circuit board holder and reflection within the OTS mate, to a fourth HOE on the OTS mate to a detector on a corresponding CB.

6. The holographic optical interconnect method of claim 5 wherein directing at least a predetermined portion of the first light beam further includes directing at least a second predetermined portion of the first light beam to another HOE.

7. The holographic optical interconnect method of claim 5 further including utilizing at least one set of a primary HOE and a secondary HOE, each carried on an OTS mate for a CB corresponding to the OTS mate, for transmitting a second light beam by a light transmitter carried by the CB to the primary HOE that is used to direct at least a predetermined portion of the second light beam to the secondary HOE, which reflects a received light beam to a detector on the CB via one of: free space within the circuit board holder and reflection within the OTS mate.

8. The holographic optical interconnect method of claim 7 wherein directing at least a predetermined portion of the second light beam further includes directing at least a second predetermined portion of the second light beam to another HOE.

9. A holographic optical interconnect system, comprising:

a plurality of opto-electronic transmitters wherein at least a first opto-electronic transmitter of the plurality of opto-electronic transmitters is coupled to a circuit board CB, for transmitting a light beam to a first optically transparent substrate OTS plate having parallel faces, wherein the first OTS plate extends beyond an edge of the CB outside of a circuit board holder and has a first holographic optical element HOE disposed on a parallel face in line with the transmitted light beam, for reflecting at least a predetermined portion of the transmitted beam within the OTS plate to a second HOE outside the circuit board holder to provide a first reflected light beam to at least a second OTS plate that is parallel to a second CB, the second OTS plate having at least a third HOE outside the circuit board holder for reflecting at least part of the at least predetermined portion of the first reflected light beam to a fourth HOE that reflects part of the predetermined portion of the first reflected light beam to a detector on a corresponding second CB.

10. The holographic optical interconnect system of claim 9 wherein at least part of the predetermined portion of the first reflected light beam is reflected by the third HOE to a third OTS plate having a fifth HOE outside the circuit board holder for reflecting the at least part of the first reflected light beam alternately within the third OTS plate to a sixth HOE for facilitating reflection of the at least part of the first reflected light beam to a detector on a corresponding third CB that is parallel to the third OTS plate.

11. The holographic optical interconnect system of claim 9 wherein the first HOE is a multiplexing HOE for reflecting in an outward fan manner to facilitate transmission of a preselected portion of the first reflected light beam to another HOE that reflects the preselected portion of the first reflected light beam to a detector disposed on the first CB.

* * * * *